United States Patent Office 3,462,405
Patented Aug. 19, 1969

3,462,405
PREPARATION OF POLYMERIZATION CATALYST
Emanuel Schoenberg, Akron, Ohio, assignor to The Goodyear Tire & Rubber Company, Akron, Ohio, a corporation of Ohio
No Drawing. Continuation-in-part of applications, Ser. No. 214,492, Aug. 3, 1962, and Ser. No. 472,706, July 16, 1965. This application Dec. 7, 1966, Ser. No. 599,981
Int. Cl. C08d 1/14, 3/10
U.S. Cl. 260—94.3     8 Claims This application is a continuation-in-part of S.N. 214,492, filed Aug. 3, 1962, and Ser. No. 472,706, filed July 16, 1965, both abandoned.

This invention relates to catalysts for the polymerization of 2-alkyl substituted conjugated diolefins, examples of which are isoprene (2-methyl butadiene-1,3), 2-ethyl butadiene-1,3; 2-propyl butadiene-1,3, and the like. It is also directed to the production of high cis-1,4 polymers of 2-alkyls substituted conjugated diolefins wherein the polymer formed resembles natural Hevea rubber. More specifically, it is directed to a process whereby these 2-alkyl substituted conjugated dienes are polymerized by means of catalysts comprising the reaction products of organoaluminum compounds, examples of which are aluminum trialkyls and/or aluminum trialkyl etherates with titanium tetrachloride, wherein said catalysts have been prepared by specific techniques. Most specifically, it is directed to a process for the production of high cis-1,4 polyisoprene polymerized by catalysts comprising the reaction products of aluminum alkyls and/or aluminum alkyl etherates and titanium tetrachloride, said catalyst having been prepared in a specific manner.

The polymerization of 2-alkyls substituted conjugated diolefins to form high cis-1,4 polymers is a relatively recent development. For instance, it is known that the reaction product of aluminum trialkyl such as aluminum triethyl and the like and a transition metal halide such as titanium tetrachloride and the like, when employed as a catalyst, will polymerize isoprene to polyisoprene in which the isoprene units are joined by cis-1,4 addition.

In general, the formation of cis-1,4 polymers by means of aluminum trialkyls and/or aluminum trialkyl etherates and a transition metal is generally carried out or conducted as a solution polymerization, i.e. the monomer is dissolved in an inert solvent or diluent such as a saturated aliphatic hydrocarbon or aromatic hydrocarbon while the polymerization takes place.

Several methods of conducting these polymerizations are known. One method is to add the required amounts of both aluminum alkyl first and then the required amount of titanium tetrachloride to a solvent or diluent in the polymerization vessel and allow these two components to react and then to add the monomer to this catalyst dispersion. Thus, this method whereby the catalyst components are allowed to react in the absence of the monomer is called "preformed" catalyst preparation. Another method is to add each catalyst component to the polymerization vessel containing the monomer and diluent. Thus, this method where the catalyst components are allowed to react in the presence of the monomer is called "in situ" catalyst preparation.

However, it has been found that these known procedures are subject to certain deficiencies. For instance, while certain of these procedures will yield a product containing polyisoprene having high cis-1,4 configuration, this product on the other hand contains undesirable low molecular weight byproducts which may cause the polymer to be unfit for certain uses. Still other of these processes, while yielding good products, produce cis-1,4 addition polymers in only very low yields or conversion. Still other of the processes described, while producing polymers of high molecular weight in good yields, tend to produce polymers containing a fairly substantial amount of a leathery type material.

It is, therefore, the object of this invention to provide a catalyst whereby 2-alkyl substituted conjugated diolefins may be polymerized to polymers having high cis-1,4 configuration and high molecular weights in good yields, free of undesirable byproducts.

It is certain modifications of the "preform" or "preformed" technique of aluminum trialkyl and/or aluminum trialkyl etherate-titanium tetrachloride catalyst make up with which this invention is concerned. It has been found quite unexpectedly that the techniques or manner employed to make up the preformed catalysts with which this invention is concerned has considerable bearing on the effectiveness of catalysts prepared from aluminum alkyls and/or aluminum alkyl etherates and titanium tetrachloride wherein the aluminum to titanium mol ratios in the final catalyst range from 0.6/1 to 1.2/1.

The objects of this invention are accomplished by polymerizing 2-alkyl substituted conjugated diolefins by the use of catalysts comprising the reaction product of aluminum trialkyls and/or aluminum trialkyl etherates and titanium tetrachloride prepared in such a manner that (a) the Al/Ti molar ratio in the reaction mixture does not exceed 1.2/1 at any stage of the preparation and (b) the Al/Ti molar ratio in the final catalyst is within 0.6/1 to 1.2/1.

The more specific objects of this invention are accomplished by polymerizing isoprene by the use of catalysts comprising the reaction product of aluminum trialkyls and/or aluminum trialkyl etherates and titanium tetrachloride prepared in such a manner that (a) the Al/Ti molar ratio in the reaction mixture does not exceed 1.2/1 at any stage of the preparation and (b) the Al/Ti molar ratio in the final catalyst is within 0.6/1 to 1.2/1.

These conditions of catalyst preparation which are critical for efficient catalytic performance in the polymerizations of the 2-alkyl substituted conjugated diolefins and specifically isoprene are best accomplished by two means. First by adding the aluminum trialkyl and/or aluminum trialkyl etherates component of the catalyst mixture gradually to the titanium tetrachloride component of the catalyst mixture, termed here "Al to Ti." This is best accomplished while both of the catalyst components are dissolved in an inert solvent. The second useful method of catalyst preparation, termed here as "simultaneous addition," is to bring the two catalyst components into contact with each other in a manner such that both components are added at a constant rate, never allowing the Al/Ti ratio of this mixture to be outside of the specified limits of 0.6/1 to 1.2/1 during the course of this operation.

It is only under the above critical conditions of preparing the catalyst by combining the aluminum trialkyl and/or aluminum trialkyl etherate and the titanium tetrachloride that high cis-1,4 rubber in good yield is obtained from the polymerization of two-alkyl substituted conjugated diolefins and particularly isoprene. By contrast, when a catalyst is prepared under conditions whereby the Al/Ti ratio is allowed to exceed 1.2/1 during the mixing, such as happens when the titanium component is added to the aluminum component during the catalyst preparation, large amounts of undesirable by-products of little or no rubbery character are obtained. The products which are obtained from a polymerization by use with a catalyst prepared by adding the titanium to the aluminum and thereby exceeding the critical limit in Al/Ti mol ratio of 1.2/1 are quite leathery materials having little rubber-like characteristics and containing high gel.

In the preparation of catalysts according to this invention it is important to employ concentrations of aluminum alkyl and/or aluminum alkyl etherates, and titanium tetrachloride which will lead to a final catalyst slurry having a molar concentration of titanium within 0.05 to 1.5 preferably between 0.1 to 1.0. This is accomplished by using an inert diluent for either the aluminum alkyl or the titanium tetrachloride or for both. By an inert diluent is meant any organic compound which will not react with either of the components and in which these materials are soluble. Inert diluents such as hydrocarbons are the most suitable. It has been found that pentane, heptane, benzene, mineral oil, petrolatum are examples of materials which are excellent for this purpose.

The temperature at which the catalysts of this invention are prepared may vary between a low of −70° C. to a high of 60° C. and above. However, more convenient temperatures for the catalyst preparations will probably vary between −40° C. and +40° C.

In view of the rather critical Al/Ti ratios required in the preparation of the catalysts of this invention and particularly in view of the importance of the concentration of the catalysts in the inert diluent or solvent, i.e. a molar concentration of titanium within 0.05 to 1.5 when the catalysts of this invention are prepared, it has been found that a modification of the "pre-formed" catalyst technique is best employed to prepare these catalysts. This modification is one wherein the preformed catalyst is prepared in a separate vessel outside of the polymerization vessel and the "preformed" catalyst made according to this invention is then utilized by adding the catalyst to the monomer and solvent in the polymerization vessel. This modification is usually necessary to maintain the proper catalyst concentration when the aluminum trialkyl and/or aluminum trialkyl etherates are reacted with titanium tetrachloride. Still another advantage in preparing the catalyst in a separate vessel is the maintenance of temperature control during the reaction of the two co-catalyst components.

The catalysts of this invention are prepared from organoaluminum compounds such as aluminum trialkyls and titanium tetrachloride or etherates of organoaluminum compounds such as aluminum trialkyl etherates and titanium tetrachloride. Representative of aluminum trialkyls are aluminum triethyl, aluminum tri-n-propyl, aluminum triisopropyl, aluminum tri-n-butyl, aluminum triisobutyl, aluminum trihexyl, aluminum triisohexyl, aluminum triheptyl, aluminum trioctyl, aluminum tricyclohexyl, and the like or mixture thereof. Also aluminum triphenyl is useful in this invention. Representatives of the aluminum trialkyl etherates are the etherates which are prepared from the aluminum alkyls recited above with phenyl ether, anisole and analogous ethers. Representative of specific etherates which are particularly suitable for use in this invention are the phenyl etherates of aluminum triethyl, aluminum triisobutyl, aluminum tri-n-propyl, aluminum triisopropyl, aluminum triisobutyl, aluminum trihexyl, aluminum triisohexyl, aluminum triheptyl, aluminum trioctyl, aluminum tricyclohexyl, aluminum triphenyl and the like; the anisole etherates of aluminum triethyl, aluminum triisobutyl, aluminum tri-n-propyl, aluminum triisopropyl, aluminum triisobutyl, aluminum trihexyl, aluminum trioctyl, aluminum tricyclohexyl, and the like. Also the phenyl and anisole etherates of aluminum triphenyl may be used. The organoaluminum aromatic etherates may be defined by the formula:

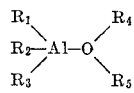

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), ary and aralkyl radicals; $R_4$ is an aromatic radical and $R_5$ is selected from the group consisting of aliphatic, alicyclic, and aromatic radicals.

The titanium tetrachloride of course should be chemically pure and be anhydrous, as water and certain other impurities are deleterious to good catalytic activity.

One particular interesting embodiment of the use of the catalysts of this invention is its use for the polymerization of isoprene. The polyisoprenes of high cis-1,4 are of particular interest since they resemble Natural Rubber in all its properties. Other monomers tested and of commercial interest are 2-ethyl-1,3-butadiene. Examples of other suitable monomers are 2-isopropyl-1,3-butadiene, 2-methyl-1,3-pentadiene and 2 substituted analogues. Mixtures of one or more conjugated dienes may be copolymerized according to the process of this invention.

In the polymerization of isoprene or other 2-alkyl substituted conjugated dienes by means of the catalysts of this invention, certain general polymerization conditions are observed. The polymerization of these monomers by means of the catalysts of this invention is usually conducted by polymerizing the monomers in an inert solvent or diluent. However, this is not to say that the practice of this invention cannot be conducted in bulk, i.e. without the use of solvents. If it is desired to employ solvents any inert diluent may be employed. The aromatic solvents such as benzene, toluene and xylene, saturated aliphatic hydrocarbons such as pentane, hexane, heptane and cyclohexane have been found to be inert and representative of the solvents or diluents useful in this invention. Any other hydrocarbon solvent or diluent which does not adversely affect the catalysts or the polymerization could also be employed. The amount of solvent employed may vary from none up to a volume ratio of 20/1 or more based on the monomer to be polymerized. However, it is usually desirable to employ volume ratios of solvent to monomer of from about 3/1 to about 6/1. The temperature employed in this polymerization has not been found to be critical and may vary over the rather wide range of −40° C. or below up to 90° C. or above. However, it is usually preferable to employ the more conventional temperatures of about 0° C. to about 80° C.

The amount of catalyst employed in the practice of this invention is not found to be too critical and may vary broadly from about 0.005 to about 4 parts calculated as parts of titanium tetrachloride as originally employed, per 100 parts by weight of the monomer to be polymerized (p.h.m.). It is to be understood that what constitutes a catalytic amount of the catalyst should be determined by the requirements of each individual polymerization and the polymerization conditions chosen. Excellent polymerizations have been conducted employing a catalyst varying from 0.005 to 1.5 parts of titanium tetrachloride (as originally used for catalyst make up) per 100 parts of isoprene.

Since the catalysts of this invention are highly susceptible to deterioration by such things as moisture, oxygen and other impurities, the practice of this invention should be conducted in an oxygen and moisture-free atmosphere to the total exclusion of impurities such as oxygen, water and any other substance containing active-hydrogen compounds such as alcohols, amines, acids and the like and any compound which will furnish oxygen or water at the polymerization conditions employed.

The method of this invention is of further commercial importance since it allows the preparation of extremely active catalysts at lower Al/Ti ratio than by any other procedure, thus resulting in substantial cost savings because the aluminum alkyl or aluminum alkyl ethereate is more expensive than TiCl₄ on a molar basis.

The above critical conditions of catalyst preparation are of added importance when these catalysts are intended to be used for polymerization purposes freshly after their preparation. This aspect is of commercial significance since the storage of catalyst would require extensive costly facilities.

Catalysts prepared by methods of this invention are substantially more active and give more reproducible polymerizations than catalysts prepared in situ, i.e., in the presence of monomers.

The practice of this invention is further illustrated by the following examples which are intended to be illustrative rather than limitative of the scope of this invention.

In these examples all parts are reported by weight unless otherwise noted.

Example 1

A preformed catalyst was prepared by adding a solution of 37.6 grams of aluminum triisobutyl dissolved in 136 grams of heptane gradually to a solution of 28.3 grams of titanium tetrachloride in 228 grams of heptane in a one liter three neck round bottom flask which was maintained at 30–35° C. by vigorous stirring and cooling. These amounts correspond to an Al/Ti molar ratio of 1.2/1. (The aluminum triisobutyl-heptane solution and titanium tetrachloride-heptane solution had been previously prepared in an inert atmosphere of nitrogen.) A catalyst of identical composition was prepared by adding the titanium tetrachloride-heptane solution to an aluminum triisobutyl-heptane solution. These two preformed catalysts in the amount of 5.8 ml. of slurry were employed to polymerize 25 ml. of isoprene diluted with 25 ml. of heptane. This amount of catalyst represents 1.61 parts of TiCl$_4$ (as originally employed) per 100 parts of monomer. The temperature employed in this polymerization was 42° C. The polymers were isolated by coagulation from isopropyl alcohol. The polymer yields and the dilute solution viscosity (DSV) of the polymers resulting from these polymerizations as well as the time of polymerization are given in Table I.

TABLE I

| | Order of Addition in Catalyst Preparation | | | |
|---|---|---|---|---|
| | Al to Ti | | Ti to Al | |
| | Percent Yield | DSV* | Percent Yield | DSV* |
| Polymerization Time (Min.): | | | | |
| 10 | 2 | | 0 | |
| 20 | 11 | 2.7 | 0 | |
| 30 | 18 | 2.7 | 4 | Power |
| 45 | 57 | 1.7 | 0 | |
| 60 | 54 | 1.7 | 10 | 1.2 |

*DSV is the dilute solution viscosity and is an indication of the molecular weight—the higher the DSV the greater the molecular weight.

Example 2

Catalysts with aluminum to titanium mol ratios varying between 0.8 and 1.3 were prepared by essentially the same procedure as in Example 1 adding a 2.0 molar solution of aluminum triisobutyl in heptane to titanium tetrachloride solution in heptane at a temperature of 40° C. Similarly catalysts were "preformed" by adding the titanium tetrachloride to the aluminum triisobutyl. Each of these catalysts were employed to polymerize 10 grams of isoprene diluted with 40 grams of pentane for a polymerization time of 22 hours at 50° C. The amount of catalyst employed in each polymerization was 0.25 p.h.m. of titanium tetrachloride as originally used to make the catalyst. The results of these polymerizations are given in Table II, wherein column 1 is the Al/Ti mol ratio; column 2 is the percent yield of solid [1] polymer obtained; column 3 is the dilute solution viscosity of the polymer; column 4 is the percent gel obtained and column 5 indicates the type of polymer form.

[1] The product of each polymerization was treated (soaked) over night with a 50:50 mixture, by volume, of isopropyl alcohol and hexane. The insoluble portion, termed solid polymer is the one reported in the tables.

TABLE II

| Order of Addition | (1) Al/Ti | (2) Percent Yield | (3) DSV | (4) Percent Gel | (5) Type of Polymer |
|---|---|---|---|---|---|
| Al to Ti | 0.8 | 75 | 2.3 | 9 | Rubbery. |
| | 0.9 | 80 | 2.1 | 6 | Do. |
| | 1.0 | 90 | 2.6 | 8 | Do. |
| | 1.1 | 85 | 3.1 | 5 | Do. |
| | 1.2 | 76 | 3.5 | 9 | Do. |
| | 1.3 | 53 | 3.5 | 7 | Do. |
| Ti to Al | 0.75 | 35 | 6.0 | 38 | Mixed, leathery, rubbery. |
| | 0.84 | 68 | 2.1 | 32 | Do. |
| | 0.94 | 78 | 2.3 | 36 | Do. |
| | 1.06 | 87 | 2.2 | 32 | Do. |
| | 1.17 | 89 | 2.2 | 28 | Do. |
| | 1.28 | 90 | 2.0 | 22 | Rubbery. |

Example 3

Catalysts were prepared with varying aluminum to titanium ratios at 90° C. by the addition of aluminum to titanium and titanium to aluminum addition. These catalysts in an amount of 0.25 p.h.m. of titanium tetrachloride, were employed to polymerize isoprene in the same manner as that in Example 2. The results are reported in Table III.

TABLE III

| Order of Addition | (1) Al/Ti | (2) Percent Yield | (3) DSV | (4) Percent Gel | (5) Type of Polymer |
|---|---|---|---|---|---|
| Al to Ti | 0.80 | 24 | 4.0 | 4 | Rubbery. |
| | 0.95 | 16 | 4.2 | 13 | Do. |
| | 1.01 | 14 | 4.4 | 12 | Do. |
| | 1.12 | 15 | 4.5 | 21 | Do. |
| | 1.23 | 14 | 4.4 | 19 | Do. |
| | 1.77 | 6 | | | Do. |
| | 0.55 | 6 | | | Mixed, leathery, rubbery. |
| Ti to Al | | | | | Do. |
| | 0.65 | 6 | | | Do. |
| | 0.75 | 6 | | | Do. |
| | 0.85 | 6 | | | Do. |
| | 0.93 | 6 | | | Do. |
| | 1.05 | 6 | | | Rubbery. |
| | 1.17 | 8 | | | Do. |

Example 4

Catalysts were prepared with varying Al/Ti ratios at −20° C. by the addition of aluminum triisobutyl to titanium tetrachloride and the reversal type (Ti to Al) addition according to the procedure given in Example 2. These catalysts in the amount of 0.25 p.h.m. of titanium tetrachloride were employed to polymerize isoprene in the same manner as that in Example 2. The results are reported in Table IV.

TABLE IV

| Order of Addition | (1) Al/Ti | (2) Percent Yield | (3) DSV | (4) Percent Gel | (5) Type of Polymer |
|---|---|---|---|---|---|
| Al to Ti | 0.78 | 90 | 2.0 | 55 | Mixed, rubbery, leathery. |
| | 0.98 | 90 | 1.8 | 31 | Rubbery. |
| | 1.08 | 95 | 2.5 | 9 | Do. |
| | 1.18 | 85 | 2.4 | 8 | Do. |
| Ti to Al | 0.78 | 58 | 2.7 | 24 | Mixed, rubber, leathery. |
| | 1.00 | 73 | 2.3 | 28 | Do. |
| | 1.11 | 79 | 2.2 | 38 | Do. |
| | 1.21 | 74 | 2.1 | 19 | Do. |
| | 1.33 | 61 | 2.3 | 26 | Rubbery. |
| | 1.44 | 32 | 2.2 | 23 | Do. |

Example 5

A heptane solution of 49.5 TiCl$_4$ in a total of 100 ml. and that of 59.5 aluminum triisobutyl in a total of 100 ml. were made up separately. The solution of the TiCl$_4$ and that of the alkyl were added at the same rate (100 ml./2 hours) to a one liter flask containing 500 ml. heptane at 20° C. The catalyst prepared by this method termed as "simultaneous addition," had a final Al/Ti ratio of 0.95. Other catalysts with varying Al/Ti ratios were made up in a similar manner. Additional catalysts were prepared at +20° C. by the Al to Ti addition as described in Example 2. All these catalysts were tested for the polymerization of 10 grams of isoprene in the same manner and amounts as that in Example 2. The results are reported in Table V.

TABLE V

| Order of Addition | (1) Al/Ti | (2) Percent Yield | (3) DSV | (4) Percent Gel | (5) Type of Polymer |
|---|---|---|---|---|---|
| Al to Ti | 0.57 | 23 | 4.5 | 32 | Mixed. |
|  | 0.77 | 54 | 2.7 | 32 | Do. |
|  | 0.88 | 79 | 2.4 | 20 | Rubbery. |
|  | 0.96 | 91 | 2.6 | 18 | Do. |
|  | 1.06 | 92 | 3.3 | 20 | Do. |
|  | 1.16 | 92 | 3.3 | 13 | Do. |
|  | 1.26 | 89 |  |  |  |
| Simultaneous | 0.6 | 79 |  |  | Mixed, leathery, rubbery. |
|  | 0.79 | 87 | 2.4 | 41 | Do. |
|  | 0.95 | 89 | 2.4 | 35 | Rubbery. |
|  | 1.18 | 72 | 2.7 | 15 | Do. |

Example 6

A catalyst of 1.0 Al/Ti molar ratio prepared by the Al to Ti addition at −20° C. as described in Example 2, was used for the polymerization of 8.4 grams 2-ethyl-1,3-butadiene diluted with 40 grams of pentane. A catalyst aliquot was used containing 0.38 p.h.m. of titanium tetrachloride as originally employed. The polymerization was carried out at 50° C. for 150 minutes. The polymer was precipitated in methanol and 2.9 grams of solid (35% yield) was recovered. The polymer had a DSV of 2.4, 4% gel and a high cis-1,4 content (estimated at 96.8%).

Twenty four hour polymerizations gave under the same experimental conditions 82 and 83% yield.

While certain representative embodiments and details have been shown for the purpose of illustrating the invention, it will be apparent to those skilled in this art that various changes and modifications may be made therein without departing from the spirit or scope of the invention.

What is claimed is:

1. In a process for the polymerization of 2-alkyl substituted conjugated diolefins to form high cis-1,4 addition polymers which comprises contacting at least one 2-alkyl substituted conjugated diolefin, under polymerization conditions, with a catalyst prepared from mixtures of titanium tetrachloride and an organoaluminum compound selected from the group consisting of aluminum trialkyls and aromatic etherates of alumium trialkyls, wherein the molar ratio of Al/Ti is within the range of from 0.6/1 to 1.2/1, the improvement comprising preforming the catalyst by bringing the said titanium tetrachloride and the said organoaluminum compound while disolved in an inert hydrocarbon diluent in contact with each other in a manner so that at no time does the Al/Ti mole ratio of the mixture exceed 1.2/1, said catalyst having a molor concentration of titanium between 0.1 and 1.0.

2. The process according to claim 1 in which the 2-alkyl substituted conjugated diolefin is isoprene.

3. The process according to claim 1 in which the 2-alkyl substituted conjugated diolefin is 2-ethyl butadiene 1,3.

4. The process according to claim 1 in which a solution of the organoluminum compound in an inert diluent is added to the titanium tetrachloride dissolved in an inert diluent.

5. The process according to claim 1 in which the organoaluminum compound dissolved in an inert diluent and the titanium tetrachloride dissolved in an inert diluent are mixed simultaneously.

6. The process according to claim 1 in which the organoaluminum compound is aluminum trihexyl anisole etherate.

7. The process according to claim 1 in which the organoaluminum compound is aluminum triisobutyl dipheny etherate.

8. The process according to claim 1 in which the organoaluminum compound is aluminum triisobutyl.

References Cited

UNITED STATES PATENTS 2,976,252   3/1961   Leary et al. _____ 252—429

FOREIGN PATENTS 856,317   12/1960   Great Britain.
880,998   11/1961   Great Britain.
215,043   4/1956    Australia.

JOSEPH L. SCHOFFER, Primary Examiner

R. A. GAITHER, Assistant Examiner